(12) United States Patent
Ono et al.

(10) Patent No.: US 10,370,281 B2
(45) Date of Patent: Aug. 6, 2019

(54) LOW SCATTERING SILICA GLASS AND METHOD FOR HEAT-TREATING SILICA GLASS

(71) Applicant: AGC Inc., Chiyoda-ku (JP)

(72) Inventors: Madoka Ono, Chiyoda-ku (JP); Setsuro Ito, Chiyoda-ku (JP); Osamu Honma, Chiyoda-ku (JP); Yousuke Amino, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 250 days.

(21) Appl. No.: 15/014,359

(22) Filed: Feb. 3, 2016

(65) Prior Publication Data

US 2016/0152504 A1    Jun. 2, 2016

Related U.S. Application Data

(63) Continuation of application No. PCT/JP2014/071329, filed on Aug. 12, 2014.

(30) Foreign Application Priority Data

Aug. 15, 2013  (JP) ................................. 2013-168950

(51) Int. Cl.
*C03C 3/06* (2006.01)
*C03B 25/02* (2006.01)
(Continued)

(52) U.S. Cl.
CPC .......... *C03B 25/02* (2013.01); *C03B 19/1453* (2013.01); *C03B 32/005* (2013.01);
(Continued)

(58) Field of Classification Search
CPC ........................ C03C 2201/00; C03C 2201/02
(Continued)

(56) References Cited

U.S. PATENT DOCUMENTS 4,981,503 A * 1/1991 Segawa .................. C03B 32/00
                                                        264/1.21
5,261,938 A   11/1993 Kitamura et al.
(Continued)

FOREIGN PATENT DOCUMENTS

JP    1-172239    7/1989
JP    4-149033    5/1992
(Continued)

OTHER PUBLICATIONS

International Search Report dated Nov. 18, 2014 in PCT/JP2014/071329 filed Aug. 12, 2014.
(Continued)

*Primary Examiner* — Noah S Wiese
(74) *Attorney, Agent, or Firm* — Oblon, McClelland, Maier & Neustadt, L.L.P.

(57) ABSTRACT

Provides is low scattering silica glass suitable as a material of an optical communication fiber. Silica glass has a fictive temperature of at least 1,000° C. and a void radius of at most 0.240 nm, as measured by positron annihilation lifetime spectroscopy. A method for heat-treating silica glass is also provided, which comprises holding silica glass to be heat-treated in an atmosphere at a temperature of at least 1,200° C. and at most 2,000° C. under a pressure of at least 30 MPa, and cooling the silica glass at an average temperature-decreasing rate of at least 40° C./min during cooling within a temperature range of from 1,200° C. to 900° C. A method for heat-treating silica glass also comprises holding silica glass to be heat-treated in an atmosphere at a temperature of at least 1,200° C. and at most 2,000° C. under a pressure of at least 140 MPa, and cooling the silica glass in an atmosphere under a pressure of at least 140 MPa during cooling within a temperature range of from 1,200° C. to 900° C.

11 Claims, 1 Drawing Sheet

(51) Int. Cl.
*C03B 37/027* (2006.01)
*C03B 19/14* (2006.01)
*C03B 32/00* (2006.01)

(52) U.S. Cl.
CPC .......... *C03B 37/02727* (2013.01); *C03C 3/06* (2013.01); *C03B 2201/04* (2013.01); *C03B 2201/075* (2013.01); *C03B 2201/31* (2013.01); *C03B 2201/42* (2013.01); *C03B 2205/56* (2013.01); *Y02P 40/57* (2015.11)

(58) Field of Classification Search
USPC .......................................................... 501/54
See application file for complete search history.

(56) References Cited

U.S. PATENT DOCUMENTS

| | | | |
|---|---|---|---|
| 5,392,375 A | 2/1995 | Kitamura et al. | |
| 5,766,291 A * | 6/1998 | Sato | C03B 19/06 65/111 |
| 7,022,633 B2 * | 4/2006 | Ikuta | C03B 19/1453 501/54 |
| 7,592,063 B2 * | 9/2009 | Ikuta | C03B 19/1453 428/312.6 |
| 8,263,511 B2 * | 9/2012 | Duran | C03B 19/1453 501/54 |
| 2010/0316858 A1 | 12/2010 | Sato et al. | |

FOREIGN PATENT DOCUMENTS

| | | |
|---|---|---|
| JP | 5-4830 A | 1/1993 |
| JP | 7-300324 | 11/1995 |
| JP | 10-67526 | 3/1998 |
| JP | 11-209132 | 8/1999 |
| JP | 2002-148466 | 5/2002 |
| JP | 2012-229150 | 11/2012 |
| JP | 2013-116843 | 6/2013 |
| WO | WO 2008/069194 A1 | 6/2008 |

OTHER PUBLICATIONS

Madoka Ono, et al., "Void structure in silica glass with different fictive temperatures observed with positron annihilation lifetime spectroscopy", Applied Physics Letters, (101), 2012, 5 pgs.

Guerette et al, "Structure and Properties of silica glass Densified in Cold Compression and Hot Compression", *Scientific Reports*, Published Oct. 15, 2015, (10 pages).

Watanabe et al, "Density and concentration fluctuations in F-doped $SiO_2$ glass, *Journal of Applied Physics*", 2004, vol. 95, No. 5, pp. 836-839.

Saito et al, "Limit of the Rayleigh scattering loss in silica fiber", *Applied Physics Letters*, 2003, vol. 83, No. 25, pp. 827-829.

* cited by examiner

LOW SCATTERING SILICA GLASS AND METHOD FOR HEAT-TREATING SILICA GLASS

TECHNICAL FIELD

The present invention relates to silica glass having a low Rayleigh scattering coefficient, and a method for heat-treating silica glass so as to reduce the Rayleigh scattering coefficient.

BACKGROUND ART

Transmission loss of an optical fiber has a significant impact on the performance of the optical communication network. As a material of an optical fiber, silica glass has been widely used. The transmission loss of an optical fiber in a wavelength region around 1,550 nm employed for usual optical communication network, is considered to be mainly due to Rayleigh scattering of silica glass.

It is known that the higher the fictive temperature of silica glass, the higher the Rayleigh scattering coefficient of the silica glass. Thus, as a method for producing an optical fiber, a method of lowering the fictive temperature of silica glass to lower the Rayleigh scattering coefficient thereby to reduce the optical transmission loss has been proposed (Patent Document 1).

Further, a method of adding a very small amount of e.g. an alkali metal to silica glass to shorten the structure relaxation time of the glass thereby to reduce the optical transmission loss has been proposed (Patent Document 2).

Silica glass is used for an optical member such as a glass substrate or a lens for lithography employing ultraviolet rays.

It is known that the transmittance of silica glass is reduced by irradiation with high energy ultraviolet rays. As a method for preventing a decrease in the transmittance of silica glass by ultraviolet rays, a method of lowering the fictive temperature of the silica glass has been known (Patent Document 3).

Patent Document 4 discloses that the hardness of silica glass can be increased by heating and pressurizing it in a specific atmosphere.

PRIOR ART DOCUMENTS

Patent Documents

Patent Document 1: JP-A-2002-148466
Patent Document 2: JP-A-2012-229150
Patent Document 3: JP-A-10-67526
Patent Document 4: JP-A-1-172239

DISCLOSURE OF INVENTION

Technical Problem

An optical fiber is usually produced by a method of softening a preform consisting of silica glass at high temperature of 2,000° C. or higher for example, and drawing it while it is quenched. Thus, the silica glass constituting the optical fiber has a high fictive temperature and has a high Rayleigh scattering coefficient. Patent Document 1 discloses that the silica glass fiber is annealed to lower the fictive temperature thereby to reduce the Rayleigh scattering coefficient.

In order to decrease the fictive temperature of silica glass to 1,000° C. or lower, it is necessary that transparent silica glass is obtained at a high temperature of at least 1,450° C. for example, an annealing step of holding the silica glass at a temperature of at most 1,000° C. until the glass structure reaches an equilibrium state. For example, since the structure relaxation time of silica glass at 900° C. is about 1,000 hours, a step for longer than 1,000 hours is necessary to produce silica glass having a fictive temperature of about 900° C.

However, if a silica glass fiber is annealed, a time necessary for production of an optical fiber is long, and to anneal the silica glass fiber, complicated or huge production facilities are necessary. Therefore, it is practically difficult to remarkably lower the fictive temperature of the silica glass fiber. Accordingly, it is difficult to sufficiently lower the Rayleigh scattering coefficient by lowering the fictive temperature of the silica glass. Therefore, silica glass with small Rayleigh scattering even having a high fictive temperature has been desired.

It is difficult to remarkably lower the Rayleigh scattering coefficient since the homogeneity of glass composition decreases by the method of adding e.g. an alkali metal to silica glass.

The object of the present invention is to provide low scattering silica glass having a low Rayleigh scattering coefficient even having a high fictive temperature, and a heat treatment method for efficiently producing such low scattering silica glass.

Solution to Problem

The present inventors have conducted extensive studies on the glass structure of silica glass and as a result, found that the smaller the voids in the glass structure, the lower the Rayleigh scattering coefficient. They have further found that the Rayleigh scattering coefficient can be lowered, when voids in the glass structure are small, even when the fictive temperature of the silica glass is high.

The present inventors have further found that in silica glass in which voids in the glass structure are small, the amount of a three-membered ring structure and a four-membered ring structure in the glass structure is small as compared with silica glass in which voids are large.

That is, the present invention provides the following [1] to [11].

[1] Silica glass, which has a fictive temperature of at least 1,000° C., and which has a void radius of at most 0.240 nm as measured by positron annihilation lifetime spectroscopy.
[2] Silica glass, which has a refractive index of at least 1.460, and which has an annihilation lifetime $T_3$ of at most 1.56 ns when a positron is captured by a void and annihilates.
[3] The silica glass according to the above [1] or [2], which has a $SiO_2$ content of at least 99% as represented by mass percentage.
[4] The silica glass according to any one of the above [1] to [3], which has a OH content of less than 50 ppm.
[5] A method for heat-treating silica glass, which comprises holding silica glass to be heat-treated in an atmosphere at a temperature of at least 1,200° C. and at most 2,000° C. under a pressure of at least 30 MPa, and cooling the silica glass at an average temperature-decreasing rate of at least 55° C./min during cooling within a temperature range of from 1,200° C. to 900° C.
[6] A method for heat-treating silica glass, which comprises holding silica glass to be heat-treated in an atmosphere at a temperature of at least 1,200° C. and at most 2,000° C. under a pressure of at least 140 MPa, and cooling the silica glass in an atmosphere under a pressure of at least 140 MPa during cooling within a temperature range of from 1,200° C. to 900° C.

[7] The method for heat-treating silica glass according to the above [5] or [6], which further comprises cooling the silica glass in an atmosphere under a pressure of at least 0.1 MPa within a temperature range of from 900° C. to 200° C.

[8] The method for heat-treating silica glass according to any one of the above [5] to [7], wherein the scattering coefficient of the silica glass after the heat treatment decreases to 60% or less of the value before the heat treatment.

[9] The method for heat-treating silica glass according to any one of the above [5] to [7], wherein the void radius of the silica glass as measured by positron annihilation lifetime spectroscopy after the heat treatment decreases to 98% or less of the value before the heat treatment.

[10] An optical communication fiber, which uses the silica glass as defined in any one of the above [1] to [4].

[11] An optical member for lithography, which uses the silica glass as defined in any one of the above [1] to [4].

Advantageous Effects of Invention

The silica glass of the present invention has a low Rayleigh scattering coefficient. Thus, by using the silica glass of the present invention, an optical communication fiber with low optical transmission loss can be obtained.

According to the method for heat-treating silica glass of the present invention, silica glass having a high fictive temperature and having a low Rayleigh scattering coefficient can be obtained.

According to one embodiment of the method for heat-treating silica glass of the present invention, silica glass having a low Rayleigh scattering coefficient can be obtained at a high cooling rate, and thus low scattering glass can be obtained with high production efficiency.

In the silica glass of the present invention, the amount of a 3-membered ring structure and a 4-membered ring structure in the glass structure is small, and accordingly, its transmittance is hardly decreased even when irradiated with ultraviolet rays. Accordingly, by using the silica glass of the present invention, an optical member such as a glass substrate or a lens for optical lithography, of which the transmittance is hardly decreased by ultraviolet rays, can be obtained.

According to one embodiment of the method for heat-treating silica glass of the present invention, silica glass with a small amount of a 3-membered ring structure and 4-membered ring structure can be obtained at a high cooling rate, and accordingly silica glass which is less likely to be colored by ultraviolet rays can be obtained with a high production efficiency.

DESCRIPTION OF EMBODIMENTS

Figure 1:
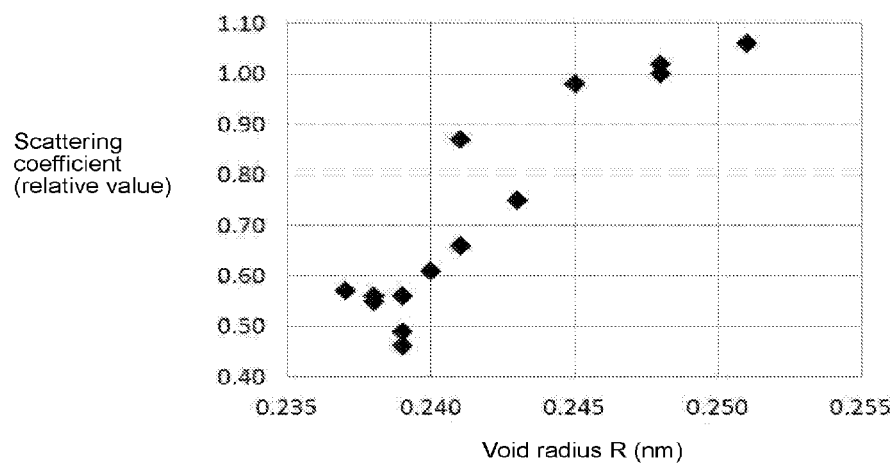
FIG. 1 is a drawing illustrating the relation between the void radius R in the glass structure and the Rayleigh scattering coefficient of silica glass.

In this specification, the glass composition is represented by mass % or ppm based on mass. Hereinafter mass % will be abbreviated as % unless otherwise specified.

The silica glass of the present invention (hereinafter referred to as "the glass of the present invention") is glass containing $SiO_2$ as the main component, preferably has a $SiO_2$ content of at least 99%, more preferably at least 99.5%, particularly preferably at least 99.7%.

The glass of the present invention may be Ge-doped silica glass in which part of Si is substituted with Ge, or Ti-doped silica glass in which part of Si is substituted with Ti.

The glass structures of the Ti-doped silica glass and Ge-doped silica glass are similar to the glass structure of silica glass consisting solely of $SiO_2$ except that part of Si is substituted with Ge or Ti.

The Ge-doped silica glass, which has a high refractive index, is used e.g. for the core of an optical communication fiber.

The Ti-doped silica glass, which has a very low thermal expansion coefficient, is used e.g. for a mirror constituting an optical system.

In a case where the glass of the present invention is the Ge-doped silica glass or the Ti-doped silica glass, it may contain $GeO_2$ or $TiO_2$ in an amount up to 15%, particularly up to 10%.

The glass of the present invention preferably has a total content of components other than $SiO_2$, $TiO_2$ and $GeO_2$ of at most 1%. Such other components may, for example, be OH, Al, P, F, Na and K.

The glass of the present invention has a OH content of preferably at most 50 ppm, more preferably at most 30 ppm. Glass having a low OH content can have a high transmittance of light at from 1.30 μm to 1.55 μm. Light at a wavelength of from 1.30 μm to 1.55 μm is used e.g. for optical communication.

Even when the glass of the present invention contains an alkali metal component such as Na or K, it has a content of an alkali metal component of at most 100 ppm, more preferably at most 50 ppm, whereby the stability of the glass is high. The glass of the present invention more preferably contains no alkali metal component such as Na or K.

The glass of the present invention has a void radius R in the glass structure of at most 0.240 nm, preferably at most 0.239 nm, as measured by positron annihilation lifetime spectroscopy. The void radius R within such a range is preferred, whereby the Rayleigh scattering coefficient will be low. If a pressure is applied too much to reduce the void radius R, the basic structure of the silica glass may be impaired. The void radius R of the glass of the present invention is typically at least 0.235 nm.

Positron annihilation lifetime spectroscopy is a technique to obtain the size of voids utilizing a property such that after a positron is captured by a void in an insulator such as silica glass, it annihilates in a lifetime depending on the size of the void. An example of the method of obtaining the void radius R by positron annihilation lifetime spectroscopy will be described below.

In measurement of the positron annihilation lifetime, in a case where $^{22}$Na is employed as a positron source, γ rays at 1.27 MeV emitted simultaneously with positrons when $^{22}$Na undergoes β decay act as the start signal. Further, γ rays at 511 KeV emitted when the emitted positrons are captured by electrons near the voids and annihilate, are measured. For measurement of the γ rays, a scintillation counter or the like is used. Using a digital oscilloscope, differences in detection time between the γ rays at 1.27 MeV as start signal and the γ rays at 511 KeV are accumulated to obtain a positron annihilation lifetime profile. The obtained positron annihilation lifetime is deconvoluted into three components represented by $\tau_1$, $\tau_2$ and $\tau_3$ by a positron lifetime spectra analyzing program (for example, POSITRON FIT EXTENDED).

$\tau_1$ is an annihilation lifetime component with an annihilation lifetime of about 150 picoseconds, and is considered to represent the annihilation lifetime of para-positronium or the annihilation lifetime of free positron.

$\tau_2$ is an annihilation lifetime component having an annihilation lifetime of about 550 picoseconds, and is considered to present the annihilation lifetime when ortho-positronium is captured e.g. by a lattice defect and annihilates.

$\tau_3$ is an annihilation lifetime component having an annihilation lifetime longer than 1 nanosecond, and is considered to represent the annihilation lifetime when ortho-positronium is captured by a void and annihilates.

A void radius R which satisfies the following formula is calculated by the value $\tau_3$. Here, r is a value representing spread of electrons and is 0.1650 nm. $R_0$ is a value representing the size of the void and spread of electrons, and $R_0$=R+r. $\pi$ is the ratio of the circumference of a circle to its diameter.

$$\frac{1}{\tau_3} = 2 \times \left[1 - \frac{R}{R_0} + \frac{1}{2\pi}\sin\left(\frac{2\pi R}{R_0}\right)\right]$$

The void radius R of a conventional silica glass fiber is, for example, from 0.251 nm to 0.255 nm.

Of the glass of the present invention, the annihilation lifetime component $\tau_3$ of a positron is preferably at most 1.56 nm, more preferably at most 1.55 nm, further preferably at most 1.54 nm. When $\tau_3$ is short, the Rayleigh scattering coefficient tends to be low.

Of the glass of the present invention, the fictive temperature Tf is at least 1,000° C., preferably at least 1,100° C. Tf is usually 1,200° C. The fictive temperature Tf is a parameter representing the glass structure and is a temperature at which the glass structure is in an equilibrium state. When glass is held at a constant temperature and reaches an equilibrium state, the fictive temperature Tf of the glass is equal to the holding temperature.

The fictive temperature Tf of glass reflects heat history of the glass. For example, in a case where glass is held at high temperature for a long period of time and reaches an equilibrium state and then is cooled, the fictive temperature Tf of the glass after cooling is higher as the cooling rate is higher. When the cooling rate is very high, the glass is cooled while the glass structure in an equilibrium state is maintained, and thus the fictive temperature Tf of the glass is equal to the holding temperature, and when the cooling rate is low, the glass structure is relaxed during cooling, and accordingly the fictive temperature Tf of the glass is lower than the holding temperature.

The fictive temperature Tf may be measured by infrared spectroscopy. That is, the fictive temperature Tf is determined from the position of a peak observed in the vicinity of 2,260 cm$^{-1}$ in an infrared transmission spectrum of glass. The peak observed in the vicinity of 2,260 cm$^{-1}$ is attributable to stretching vibration of a Si—O—Si bond. Specifically, the vicinity of the peak is approximated by the following function f(X) of the wave number x:

$f(x)=a(x-b)2+c$(wherein $a$, $b$ and $c$ are constants)

and the fictive temperature Tf (unit: ° C.) is obtained by the following calculation formula from the constant b:

$Tf=43809.21/(b-2228.64)-273.15$

When glass is pressurized, its glass structure is influenced also by pressure history. Accordingly, glasses different in the pressure history may have different glass structures in some cases even though they have the same fictive temperature Tf. The glass of the present invention has a small void radius R as compared with conventional silica glass having the same Tf.

In a step of producing a silica glass fiber, a preform consisting of silica glass is melted at high temperature and then pulled while it is quenched. Here, the fictive temperature Tf of a silica glass fiber is generally at least 1,100° C., and is usually from about 1,400° C. to about 1,630° C.

The glass of the present invention, which has a fictive temperature Tf of at least 1,000° C., is considered to have a high refractive index and high hardness as compared with annealed silica glass having Tf of less than 1,000° C. Further, the glass of the present invention, which has a small void radius R as compared with conventional silica glass having the same fictive temperature Tf, is considered to have a high refractive index and high hardness.

The silica glass of the present invention has a refractive index of at least 1.460. Here, the refractive index is meant for a refractive index regarding d-line. The refractive index of the silica glass of the present invention is preferably at least 1.461. The refractive index is usually at most 1.475.

The glass of the present invention has a low Rayleigh scattering coefficient. The Rayleigh scattering coefficient of the glass of the present invention with respect to light at 1.55 µm can be made to be at most 0.85 dB/Km, particularly at most 0.065 dB/Km. The Rayleigh scattering coefficient may be relatively evaluated by a method of measuring the scattering intensity of third harmonic (355 nm) of YAG laser as the excitation light.

The Rayleigh scattering occurs due to fluctuation of structures or particles much smaller than the wavelength of light. Of conventional silica glass, the higher the fictive temperature Tf, the higher the Rayleigh scattering coefficient.

The glass of the present invention, which has a low Rayleigh scattering coefficient, can be used as a material of e.g. an optical communication fiber.

The glass of the present invention has a small amount of 3-membered ring and 4-membered ring structures contained in the glass structure. In general, the glass structure of silica glass is composed of stable 5-membered ring and 6-membered ring structures and unstable 3-membered ring and 4-membered ring structures. The unstable 3-membered and 4-membered ring structures are easily broken when irradiated with ultraviolet rays, thus leading to a decrease in the transmittance.

The amount of the 3-membered ring structure and the 4-membered ring structure in silica glass may be evaluated by measuring a Raman spectrum. The amount of the 4-membered ring structure is estimated by a value obtained by dividing the intensity of a peak (D1 peak) with a wave number in the vicinity of 495 cm$^{-1}$ by the intensity of a base peak. Further, the amount of the 3-membered ring structure is estimated by a value obtained by dividing the intensity of a peak (D2 peak) with a wave number in the vicinity of 605 cm$^{-1}$ by the intensity of a base peak. The base peak is preferably a peak derived from structural vibration of silica glass or its harmonic, and is preferably, for example, a peak in the vicinity of 500, 800, 1,100, 1,300, 1,600 or 2,300 cm$^{-1}$.

When the peak intensity is measured, it is preferred to correct for the influence of the sensitivity variation of the apparatus with an appropriate standard sample.

The D1 peak intensity is preferably at most 0.86, more preferably at most 0.84, where the D1 peak intensity is 1.00 with respect to silica glass not subjected to pressure treatment having a fictive temperature Tf of 1,246° C. The D2 peak intensity is preferably at most 0.63, more preferably at most 0.60, where the D2 peak intensity is 1.00 with respect to silica glass not subjected to pressure treatment having a fictive temperature Tf of 1,246° C.

The glass of the present invention, which has a small amount of 3-membered ring and 4-membered ring structures contained in the glass structure, is considered to have less defects by ultraviolet rays, and thus it is suitably used, for example, for an optical member such as a lens or a photomask substrate for lithography.

Usually, silica glass having a high refractive index has a large amount of unstable structures in the glass structure. This is because silica glass having a high fictive temperature tends to have a high refractive index, and silica glass having a high fictive temperature tends to have a high density of unstable structures. The glass of the present invention has properties such that it has a small amount of unstable structures even though it has a high refractive index.

The glass of the present invention may be produced by the method for heat-treating silica glass of the present invention (hereinafter referred to as "the method of the present invention"). The method of the present invention is the aftermentioned "first method of the present invention" or "second method of the present invention".

The first method of the present invention is a method for heat-treating silica glass, which comprises holding silica glass to be heat-treated in an atmosphere at a temperature of at least 1,200° C. and at most 2,000° C. under a pressure of at least 30 MPa, and cooling the silica glass at an average temperature-decreasing rate of at least 55° C./min during cooling within a temperature range of from 1,200° C. to 900° C. The first method of the present invention comprises a first step of applying a pressure to silica glass to be heat-treated at high temperature, a second step of cooling the silica glass to 900° C., and as the case requires, a third step of further cooling the silica glass.

The first step is a step of applying a pressure to silica glass to be heat-treated at high temperature. In the first step, it is considered that voids in the glass structure are compresses and become small.

The silica glass to be heat-treated is preferably dense glass. Dense glass is glass in which no bubble having a diameter of 1 μm or larger is confirmed. When the silica glass to be heat-treated is such dense glass, dense low scattering glass tends to be obtained. Further, of the silica glass to be heat-treated, the OH content is preferably less than 50 ppm, more preferably from 5 to 30 ppm. When the OH content of the silica glass to be heat-treated is less than 50 ppm, low scattering glass having a high light transmittance tends to be obtained.

In the first method of the present invention, in the first step, a pressure is applied to the silica glass within a temperature range of at least 1,200° C. and at most 2,000° C. The pressure applied to the silica glass in the first step is at least 30 MPa, preferably at least 60 MPa, more preferably at least 110 MPa, further preferably at least 140 MPa as the pressure in the atmosphere. The void radius R can be decreased by increasing the pressure. The pressure applied is preferably at most 1,000 MPa, whereby the silica glass will easily be formed into a desired shape.

In the first step, the time over which the pressure of at least 30 MPa is applied is preferably at least a time necessary for the glass structure to relax at the temperature, since the voids in the glass structure are decreased by the relaxation of the glass structure. The time necessary for the glass structure to relax is at a level of $1\times10^{-4}$ second at 2,000° C., at a level of $1\times10^{-3}$ second at 1,800° C., at a level of $1\times10^{-2}$ second at 1,600° C., and at a level of $1\times10^2$ seconds at 1,200° C.

In the method of the present invention, the time over which a predetermined pressure is applied is preferably at least 2 hours. If the time over which a pressure is applied is too long, inclusion or diffusion of impurities tends to occur, and accordingly it is preferably at most 15 hours. The time over which a pressure is applied is particularly preferably from 2 to 4 hours.

In the first step, it is preferred to apply a pressure uniformly from the surface of the silica glass. By applying a pressure uniformly, silica glass with small refractive index distribution and with small transmission loss can be obtained. As a method of applying a pressure, for example, a hot pressing apparatus (HP) or a hot isostatic pressure apparatus (HIP) may be used. In a case where HP or HIP is used, it is preferred to carry out a high temperature high pressure treatment in an inert gas atmosphere. The inert gas is preferably argon, xenon, nitrogen or the like. In such a case, the silica glass can be substantially uniformly pressurized from the surface of the silica glass toward the center direction by the pressure of the inert gas.

In the first step, the pressure may be increased while the temperature of the silica glass to be heat-treated is increased, the pressure may be increased after the temperature is increased, or the pressure may be increased and then the temperature is increased. It is preferred to increase the pressure while the temperature is increased, since the time in which the glass is held at high temperature is shortened, whereby impurities are less likely to be included in the glass. Further, it is preferred to increase the temperature at a rate of at least 10° C./min, whereby the entire process time is shortened.

In the second step, the glass heated and pressurized in the first step is cooled to 900° C.

In the first method of the present invention, the glass is cooled at an average cooling rate of at least 55° C./min from 1,200° C. to 900° C. The average cooling rate from 1,200° C. to 900° C. is preferably at least 60° C./min, more preferably at least 65° C./min. The average cooling rate is usually at most 2,000° C./min. By increasing the cooling rate, the glass is cooled while small voids are maintained. Further, by increasing the cooling rate, the fictive temperature can be increased.

The temperature at which cooling is started may be higher than 1,200° C. The temperature at which cooling is started is preferably at least 1,300° C., more preferably at least 1,400° C. The temperature at which cooling is started is usually at most 2,200° C. By rapidly cooling the glass from high temperature, the glass structure at high temperature can be maintained.

In a case where in the first step, the glass is pressurized by using e.g. a conventional HP apparatus, if the temperature is low, the pressure of the gas is increased by a pump, however, the pressure is increased also by expansion of the gas along with an increase of the temperature. That is, after the temperature is increased, it is common to terminate entry of the gas. Accordingly, in the second step, usually, the pressure is decreased by compression of the gas along with a decrease of the temperature.

The third step is a step carried out preferably as the case requires, and in the third step, the glass cooled to 900° C. in the second step is further cooled to a temperature required depending upon the purpose of use, usually 0 to 200° C. The cooling rate in the third step is optionally selected depending upon the purpose of use, and is usually from 2 to 1,800° C./min, preferably from 10 to 1,000° C./min. Further, the pressure in the third step is usually from 0.1 to 200 MPa, preferably from 0.1 to 50 MPa. In the third step, the rate of relaxation of the glass structure is very low, and the size of the voids in the glass structure does not substantially change. The structure relaxation time of the silica glass at 900° C. is about 1,000° C. To shorten the step, it is preferred to increase the cooling rate.

The second method of the present invention is a method for heat-treating silica glass, which comprises holding silica glass to be heat-treated in an atmosphere at a temperature of at least 1,200° C. and at most 2,000° C. under a pressure of at least 140 MPa, and cooling the silica glass while a pressure of at least 140 MPa is applied during cooling within a temperature range of from 1,200° C. to 900° C.

The second method of the present invention comprises a first step of applying a pressure to silica glass to be heat-treated at high temperature, a second step of cooling the silica glass to 900° C. while a pressure is applied, and a third step of further cooling the silica glass. In the following description, description of the same points as in the first method is omitted.

In the second method of the present invention, in the first step, a pressure of at least 140 MPa is applied to the silica glass within a temperature range of at least 1,200° C. and at most 2,000° C. The pressure applied is preferably at least 150 MPa, more preferably at least 160 MPa as the ambient temperature. By applying a high pressure, the voids in the glass structure can be made small. The pressure applied is preferably at most 1,000 MPa, whereby the glass structure of the silica glass is less likely to be broken, and the silica glass will easily be processed into a desired shape.

In the first step, the time over which a pressure of at least 140 MPa is applied is preferably at least a time necessary for the glass structure to relax at the temperature of the first step, since the voids in the glass structure are made small by the glass structure relaxing.

In the method of the present invention, the time over which a predetermined pressure is applied is preferably at least 1 hour, more preferably at least 2 hours. If the pressure over which a pressure is applied is too long, inclusion or diffusion of impurities is likely to occur, and accordingly it is preferably at most 15 hours.

In the second method of the present invention, in the second step, pressure is applied onto the glass while it is cooled from 1,200° C. to 900° C. The pressure applied is at least 140 MPa, preferably at least 150 MPa, more preferably at least 160 MPa. By applying a high pressure, the voids in the glass structure can be made small. The pressure applied is preferably at most 1,000 MPa, whereby the glass structure of the silica glass is less likely to be broken, and the silica glass will easily be processed into a desired shape.

In the method of the present invention, the Rayleigh scattering coefficient of the silica glass decreases to 80% or less, more preferably 60% or less, particularly preferably 20 to 55% of the value before the heat treatment, after the heat treatment. That is, where the scattering intensity by the silica glass before the heat treatment is 100%, the scattering intensity of the silica glass after the heat treatment is preferably at most 80%, more preferably at most 70%, particularly preferably at most 60%.

In the method of the present invention, the void radius R of the silica glass decreases to 98% or less, more preferably 90 to 97% of the value before the heat treatment, after the heat treatment. That is, where the void radius of the silica glass before the heat treatment is 100%, the void radius of the silica glass after the heat treatment is preferably at most 98%, more preferably at most 97%.

EXAMPLES

Now, the present invention will be described in further detail with reference to Examples. However, it should be understood that the present invention is by no means restricted thereto.

Ex. 1 to 3, 6 to 8 and 14 are Examples of the glass of the present invention, and Ex. 4 to 5 and 9 to 13 are Comparative Examples.

Ex. 1 to 3, 6 and 14 are Examples of the first method of the present invention.

Ex. 7 and 8 are Examples of the second method of the present invention.

[Heat Treatment of Silica Glass]

Ex. 1 and 2

Dense silica glass having a OH content of less than 50 ppm was put in a pressure container and heated while the pressure of an argon gas as a pressure medium was increased by a pump using a HIP apparatus. The silica glass was held for 3.5 hours in a state where a pressure (unit: MPa) as identified in the section on pressure 1 in Table 1 or 2 was applied at 1,800° C., and then the pump was terminated and the silica glass was quenched. The average cooling rate (unit: ° C./min) from 1,200° C. to 900° C. was shown in the section on temperature-decreasing rate. In the temperature-decreasing process, the pressure was decreased by compression of the gas.

In Tables 1 and 2, the pressure 1 is the maximum pressure (unit: MPa) applied at the temperature identified in the section on temperature, and the pressure 2 is the pressure (unit: MPa) when the temperature reached 900° C. in the cooling process.

The holding time 1 shown in Tables 1 and 2 is the time over which the silica glass was held while the pressure as identified by the pressure 1 was applied at the temperature identified in the section on temperature, the holding time 2 is the time over which the silica glass was held at a temperature of at least 1,200° C., and the temperature-decreasing rate is the average cooling rate (unit: ° C./min) from 1,200° C. to 900° C.

Ex. 3 to 5

The heat treatment was carried out in the same manner as in Ex. 1 except that the same silica glass as in Ex. 1 and 2 was held for 3.5 hours in a state where a pressure (unit: MPa) as identified in the section on pressure 1 in Table 1 was applied at 1,800° C.

Ex. 6 and 7

The same silica glass as in Ex. 1 was held for 2 hours at 1,800° C. while the pressure as identified in the section on pressure 1 in Table 1 was applied, and then the temperature was decreased to 1,600° C. in Ex. 6 and to 1,200° C. in Ex. 7, whereupon the pressure was decreased by the decrease in the temperature. Thus, the pressure was increased again by a pump, and the silica glass was held for 0.5 hour while the pressure as identified in the section on pressure 1 was applied. Then, the pump was terminated, and the silica glass was quenched.

Ex. 8

The heat treatment was carried out in the same manner as in Ex. 1 except that the same silica glass as in Ex. 1 was held for 1 hour at 1,800° C. while the pressure as identified in the section on pressure 1 in Table 1 was applied, and then the silica glass was slowly cooled. Here, in order to prevent a decrease in the pressure by compression of the gas along with a decrease in the temperature, a gas was kept being supplied by a pump to maintain the pressure as identified in the section on pressure 1.

Ex. 9

The silica glass was treated in the same manner as in Ex. 8 except that the pump was terminated and the silica glass was cooled. The gas was compressed along with the decrease of the temperature, and the pressure was decreased.

Ex. 10, 12 and 13

The heat treatment was carried out in the same manner as in Ex. 1 except that the same silica glass as in Ex. 1 was heated while the container was open so that the silica glass was not pressurized. Ex. 13 is an example in which so-called precise annealing or super slow cooling was carried out.

Ex. 11

Silica glass before the heat treatment.

Ex. 14

The heat treatment was carried out in the same manner as in Ex. 1 except that the same silica glass as in Ex. 1 was held for 9 hours at 1,800° C. while the pressure as identified in the section on pressure 1 in Table 2 was applied.

From the above-treated silica glass, a plate-like sample of 15 mm×15 mm×1 mm, having the surface of 15 mm×15 mm mirror-polished, and a cubic sample of 10 mm×10 mm×10 mm having each surface mirror-polished were obtained.
[Measurement of Physical Treatment]
<Measurement of R>

An aqueous solution containing $^{22}$Na source was wrapped with a polyimide film and sandwiched between the two plate-like samples. A BaF$_2$ scintillator was placed in contact with the plate-like samples, and using a digital oscilloscope (manufactured by LeCroy, WavePro 960), a difference in the detection time between γ rays at 1.27 MeV and 511 KeV was obtained, and 3×10$^6$ count data were accumulated to obtain a positron annihilation lifetime profile. Using a calculation program (POSITRON FIT EXTENDED), $\tau_3$ (unit: ns) was obtained, and R (unit: nm) was calculated in accordance with the above-described formula. Further, the size of R after the heat treatment is shown as the R ratio (unit: %) in Table 1 or 2, normalized by the void radius R before the heat treatment as 100%.
<Measurement of Fictive Temperature Tf>

The plate-like sample was dipped in a 10 mass % HF-2.5 mass % H$_2$SO$_4$ aqueous solution to remove abrasive grains, scars, etc. remaining on the surface, and an infrared transmission spectrum was measured by an infrared spectrometer (manufactured by Nicolet, Magna 760). Scanning was carried out 64 times to get the average while the incident angle was fixed at 6.5°, and the data interval was about 0.5 cm$^{-1}$. The fictive temperature Tf (unit: ° C.) was obtained by the above-described method from the largest peak observed in the vicinity of 2,260 cm$^{-1}$ in the obtained spectrum.
<Measurement of Refractive Index>

With respect to the cubic sample, the refractive index of d-line (587.56 nm) was measured by a refractive index measuring apparatus (manufactured by Shimadzu Corporation, precision refractometer KPR-2000).
<Measurement of Rayleigh Scattering Coefficient (Relative Value)>

Light at 355 nm emitted from YAG laser was applied to the plate-like sample, and while the irradiated light intensity (A) was measured by a PIN photodiode, the signal intensity (B) by Rayleigh scattering at 90° relative to the direction of the excitation light was simultaneously measured. The Rayleigh scattered light was condensed by a 50-power object lens on a light-receiving surface of the PIN photodiode. The signals (A) and (B) were input into a digital oscilloscope, the pulse oscillation signal (80 kHz) of YAG laser was input as a trigger signal, and a signal synchronized therewith was analyzed. The signal was accumulated 256 times, and the (B)/(A) intensity ratio, relative to the scattering coefficient in Ex. 12 of 1.00, is shown. Further, the scattering coefficient after the heat treatment is shown as the scattering ratio (unit:%) in Table 1 or 2, which is normalized by the value before the heat treatment as 100%.
<Measurement of Raman Spectrum>

Using a laser Raman spectrometer (manufactured by Thermo Fischer Scientific K.K., DXR Raman microscope), the above-described D1 peak intensity and D2 peak intensity were measured, using 532 nm laser as the excitation light. The obtained Raman spectrum was corrected for the sensitivity by a fluorescence spectrum of a rhodamine 6G aqueous solution. The relative intensities of the D1 peak and the D2 peak compared to the base peak were obtained and normalized by the value obtained with respect to Ex. 11, and the results are shown in Tables 1 and 2. As the base peak, a peak in the vicinity of 800 cm$^{-1}$ was used.

The D2 peak intensity is preferably at most 0.63, more preferably at most 0.60.

The D1 peak intensity is preferably at most 0.86, more preferably at most 0.84.

TABLE 1

|  | Ex. 1 | Ex. 2 | Ex. 3 | Ex. 4 | Ex. 5 | Ex. 6 | Ex. 7 |
|---|---|---|---|---|---|---|---|
| Temperature [° C.] | 1800 | 1800 | 1800 | 1800 | 1800 | 1800 | 1800 |
| Holding time 1 [min] | 210 | 210 | 210 | 210 | 210 | 120 | 120 |
| Holding time 2 [min] | 215 | 215 | 215 | 215 | 215 | 150 | 240 |
| Pressure 1 [MPa] | 200 | 160 | 90 | 60 | 30 | 200 | 200 |
| Pressure 2 [MPa] | 113 | 90 | 51 | 34 | 17 | 125 | 159 |
| Temperature-decreasing rate [° C./min] | 62 | 65 | 62 | 52 | 41 | 69 | 75 |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| $\tau_3$ [ns] | 1.533 | 1.542 | 1.553 | 1.563 | 1.576 | 1.555 | 1.538 |
| R [nm] | 0.238 | 0.239 | 0.240 | 0.241 | 0.243 | 0.239 | 0.239 |
| R ratio [%] | 96.0 | 96.4 | 96.8 | 97.2 | 98.0 | 96.4 | 96.4 |
| Tf | 1147 | 1129 | 1128 | 1118 | 1102 | 1144 | 1160 |
| Refractive index | 1.4614 | 1.4608 | 1.4599 | 1.4595 | 1.4592 | 1.4616 | 1.462 |
| Scattering coefficient | 0.55 | 0.56 | 0.61 | 0.66 | 0.75 | 0.49 | 0.46 |
| Scattering ratio [%] | 54 | 55 | 60 | 64 | 74 | 48 | 45 |
| D2 peak intensity | 0.64 | 0.70 | 0.74 | 0.71 | 0.69 | 0.66 |  |
| D1 peak intensity | 0.82 | 0.86 | 0.86 | 0.89 | 0.88 | 0.84 |  |

TABLE 2

|  | Ex. 8 | Ex. 9 | Ex. 10 | Ex. 11 | Ex. 12 | Ex. 13 | Ex. 14 |
|---|---|---|---|---|---|---|---|
| Temperature [° C.] | 1800 | 1800 | 1800 |  | 1200 | 1800 | 1800 |
| Holding time 1 [min] | 60 | 60 | 210 |  | 600 | 210 | 540 |
| Holding time 2 [min] | 240 | 240 | 211 |  | 600 | 810 | 545 |
| Pressure 1 [MPa] | 200 | 200 | 0.1 |  | 0.1 | 0.1 | 200 |
| Pressure 2 [MPa] | 200 | 110 | 0.1 |  | 0.1 | 0.1 | 113 |
| Temperature-decreasing rate [° C./min] | 3.3 | 3.3 | 1600 |  | 100 | 1 | 58 |
| $\tau_3$ [ns] | 1.525 | 1.564 | 1.653 | 1.619 | 1.621 | 1.600 | 1.530 |
| R [nm] | 0.237 | 0.241 | 0.251 | 0.248 | 0.248 | 0.245 | 0.238 |
| R ratio [%] | 95.6 | 97.2 | 101.2 | 100.0 | 100.0 | 98.8 | 96.0 |
| Tf [° C.] | 1145 | 1146 | 1450 | 1246 | 1189 | 1062 |  |
| Refractive index | 1.4622 | 1.4622 | 1.4591 | 1.4588 | 1.4587 | 1.4586 | 1.4611 |
| Scattering coefficient | 0.57 | 0.87 | 1.06 | 1.02 | 1.00 | 0.98 | 0.56 |
| Scattering ratio [%] | 55.9 | 85.3 | 103.9 | 100.0 | 98.0 | 96.1 | 55 |
| D2 peak intensity | 0.62 |  |  | 1.00 |  | 0.63 | 0.59 |
| D1 peak intensity | 0.81 |  |  | 1.00 |  | 0.84 | 0.80 |

FIG. 1 is a plot illustrating the relation between the void radius R and the Rayleigh scattering coefficient (relative value) of the silica glass in each of Ex. 1 to 14. In FIG. 1, the vertical axis represents the relative value of the Rayleigh scattering coefficient, and the horizontal axis represents the void radius R (unit: nm).

By comparison between Ex. 1 and Ex. 9, it is found that the scattering coefficient is low when the temperature-decreasing rate is high. Further, by comparison between Ex. 1 to 6 and Ex. 11, it is found that the amount of the 3-membered ring structure and the 4-membered ring structure is small when the void radius R is small.

By comparison between Ex. 1 and Ex. 2 to 4, it is found that the scattering coefficient is lower when the pressure applied at high temperature is higher.

By comparison between Ex. 8 and Ex. 9, it is found that the scattering coefficient is low when the pressure at 900° C. is high.

Figure 2:
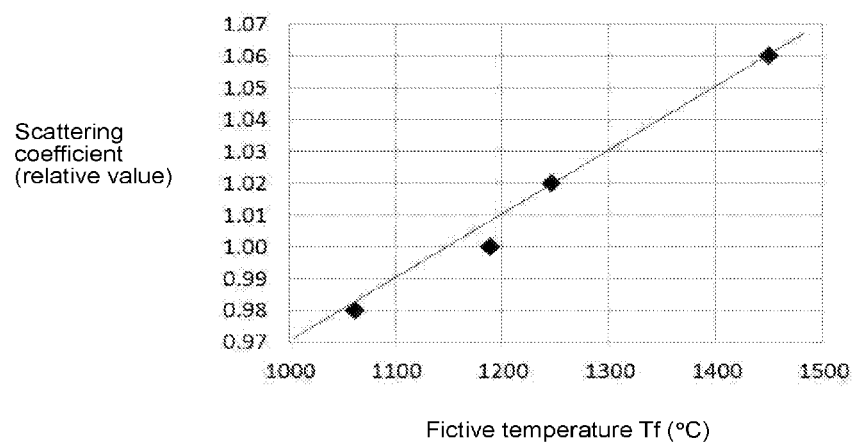
FIG. 2 is a drawing illustrating the relation between the fictive temperature Tf and the Rayleigh scattering coefficient of silica glass.

FIG. 2 is a diagram illustrating the relation between the fictive temperature Tf and the Rayleigh scattering coefficient (relative value) of the silica glass in each of Ex. 10 to 13. The lower Tf is, the lower the scattering coefficient tends to be, however, it is difficult to lower the fictive temperature of the silica glass fiber to lower than 1,000° C., and it is found that the scattering coefficient (relative value) can hardly be at most 0.97.

INDUSTRIAL APPLICABILITY

The silica glass of the present invention is useful as a material of an optical communication fiber. Further, the method for heat-treating silica glass of the present invention is useful as a method for producing low scattering silica glass.

This application is a continuation of PCT Application No. PCT/JP2014/071329 filed on Aug. 12, 2014, which is based upon and claims the benefit of priority from Japanese Patent Application No. 2013-168950 filed on Aug. 15, 2013. The contents of those applications are incorporated herein by reference in their entireties.

What is claimed is:

1. Silica glass, which has a fictive temperature of at least 1,000° C. and a void radius of at most 0.240 nm, as measured by positron annihilation lifetime spectroscopy, wherein
a content of $SiO_2$ in the silica glass is at least 99.7 mass %,
an OH content in the silica glass is at most 50 ppm,
a content of an alkali metal component in the silica glass is at most 100 ppm, and
a Rayleigh scattering coefficient of the silica glass with respect to light at 1.55 μm is at most 0.065 dB/Km.

2. Silica glass, which has a refractive index of at least 1.460 and an annihilation lifetime $\tau_3$ of at most 1.56 ns when a positron is captured by a void and annihilates, wherein
a content of $SiO_2$ in the silica glass is at least 99.7 mass %,
an OH content in the silica glass is at most 50 ppm,
a content of an alkali metal component in the silica glass is at most 100 ppm, and
a Rayleigh scattering coefficient of the silica glass with respect to light at 1.55 μm is at most 0.065 dB/Km.

3. A method for heat-treating silica glass, which comprises holding silica glass to be heat-treated in an atmosphere at a temperature of at least 1,200° C. and at most 2,000° C. under a pressure of at least 30 MPa, and cooling the silica glass at an average temperature-decreasing rate of at least 55° C./min during cooling within a temperature range of from 1,200° C. to 900° C., wherein the silica glass of claim 2 is produced.

4. A method for heat-treating silica glass, which comprises holding silica glass to be heat-treated in an atmosphere at a temperature of at least 1,200° C. and at most 2,000° C. under a pressure of at least 140 MPa, and cooling the silica glass in an atmosphere under a pressure of at least 140 MPa during cooling within a temperature range of from 1,200° C. to 900° C., wherein the silica glass of claim 2 is produced.

5. The method for heat-treating silica glass according to claim 3, which further comprises cooling the silica glass in an atmosphere under a pressure of at least 0.1 MPa within a temperature range of from 900° C. to 200° C.

6. The method for heat-treating silica glass according to claim 3, wherein the scattering coefficient of the silica glass after the heat treatment decreases to 60% or less of the value before the heat treatment.

7. The method for heat-treating silica glass according to claim 3, wherein the void radius of the silica glass as measured by positron annihilation lifetime spectroscopy after the heat treatment decreases to 98% or less of the value before the heat treatment.

8. An optical communication fiber, which uses the silica glass as defined in claim 1.

9. An optical member for lithography, which uses the silica glass as defined in claim 1.

10. An optical communication fiber, which uses the silica glass as defined in claim 2.

11. An optical member for lithography, which uses the silica glass as defined in claim 2.

* * * * *